US006765685B1

(12) United States Patent
Yu

(10) Patent No.: US 6,765,685 B1
(45) Date of Patent: Jul. 20, 2004

(54) PRINTING ELECTRONIC DOCUMENTS WITH AUTOMATICALLY INTERLEAVED SEPARATION SHEETS

(75) Inventor: Zhongming Yu, Redwood Shores, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/235,841

(22) Filed: Jan. 22, 1999

(51) Int. Cl.[7] .............................................. G06F 15/00
(52) U.S. Cl. ...................................... 358/1.13; 358/1.1
(58) Field of Search ......................... 358/1.1, 1.9, 1.12, 358/1.13, 1.17, 1.18, 452, 498; 399/382, 401

(56) References Cited

U.S. PATENT DOCUMENTS

| | | | | |
|---|---|---|---|---|
| 4,681,428 A | * | 7/1987 | Devoy ......................... | 399/382 |
| 5,316,279 A | * | 5/1994 | Corona et al. ............. | 270/1.01 |
| 5,337,135 A | * | 8/1994 | Malachowski et al. ..... | 399/401 |
| 5,353,388 A | * | 10/1994 | Motoyama ................. | 358/1.18 |
| 5,442,732 A | | 8/1995 | Matysek et al. | |
| 5,481,353 A | * | 1/1996 | Hicks et al. ................ | 399/382 |
| 5,695,183 A | * | 12/1997 | Stoub .......................... | 271/14 |
| 5,749,024 A | * | 5/1998 | Young ......................... | 399/85 |

FOREIGN PATENT DOCUMENTS

EP 0768265 B1 1/2002

* cited by examiner

Primary Examiner—Gabriel Garcia
(74) Attorney, Agent, or Firm—Christian A. Nicholes; Hickman Palermo Truong & Becker LLP

(57) ABSTRACT

A method and apparatus for outputting an electronic document, in which separation pages are automatically interleaved between successively printed pages of the electronic document. In one embodiment, the invention provides a method of printing an electronic document on transparency film using a computer printer having at least two (2) paper source trays. The method may involving modifying an existing printer driver associated with the printer to cause the printer to print pages of the document on sheets of transparency film obtained from a first paper source tray, and to automatically interleave blank sheets obtained from a second paper source tray between successively printed pages. For example, an existing printer driver is modified by automatically generating a new computer printer driver based on an existing printer description file that is associated with the existing printer driver, to redefine pagination and paper source tray attributes of the description file.

15 Claims, 9 Drawing Sheets

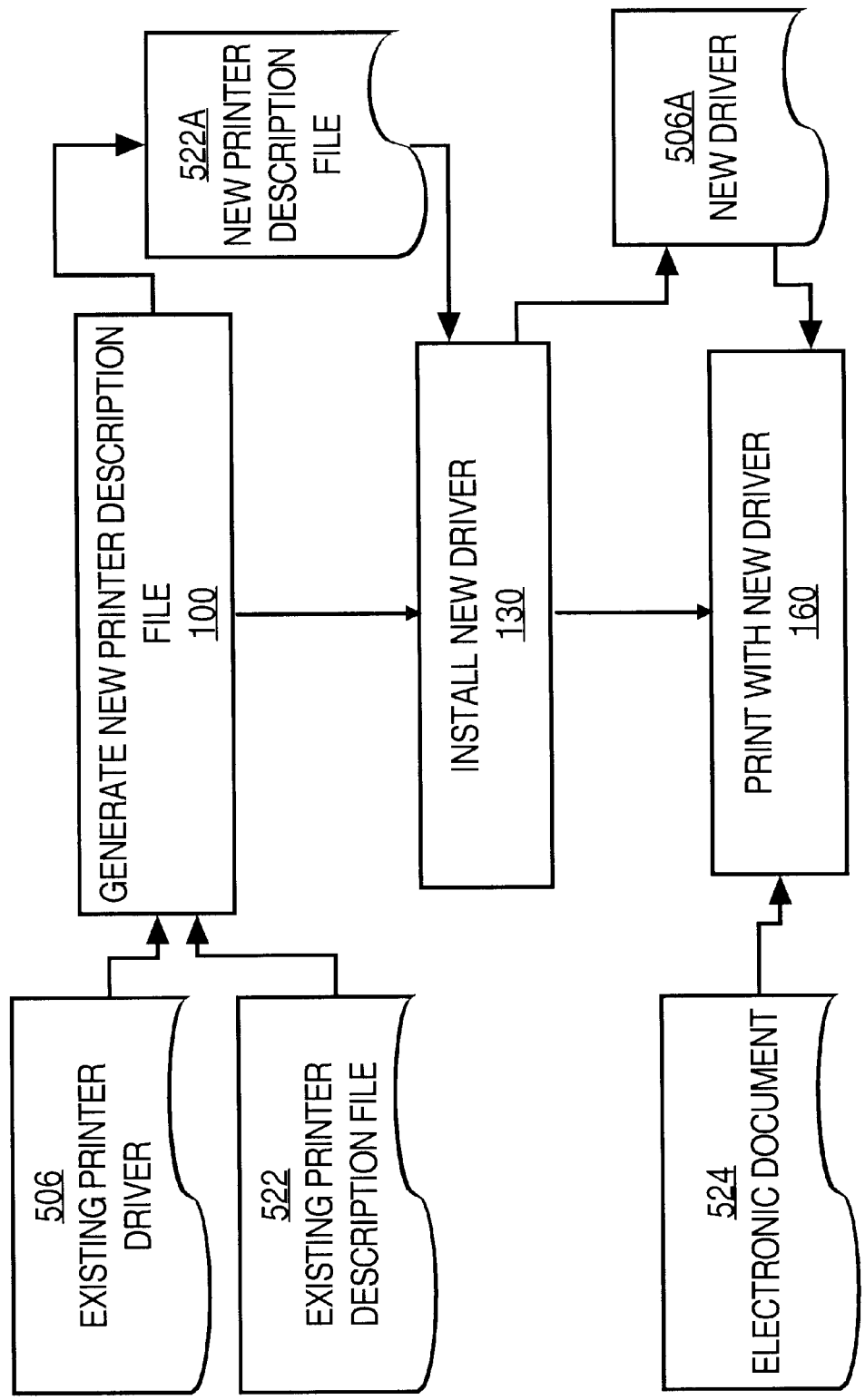

PRINTING ELECTRONIC DOCUMENTS WITH AUTOMATICALLY INTERLEAVED SEPARATION SHEETS

REFERENCE TO A COMPUTER PROGRAM LISTING

The present specification makes reference to a computer program listing contained in an Appendix, which is stored on one CD-ROM in a file titled "appendix.txt", the complete contents of which are incorporated by reference as if fully contained herein.

COPYRIGHT AUTHORIZATION

A portion of the disclosure of this patent document contains material which is subject to copyright protection. The copyright owner has no objection to the facsimile reproduction by any one of the patent disclosure, as it appears in the U.S. Patent & Trademark Office patent files or records, but otherwise reserves all copyright rights whatsoever.

FIELD OF THE INVENTION

The present invention relates to automatic document processing. The invention relates more specifically to printing electronic documents with automatically interleaved separation sheets.

BACKGROUND OF THE INVENTION

One method of communicating information is to display the information by projecting it onto a screen to be viewed by a number of spectators. An example is the use of transparencies that bear printed information for projection onto a screen by means of an overhead projector. With the widespread use of computers coupled with the ease of use of word processing computer programs, it has become commonplace for anyone to produce transparencies bearing printed information for a myriad of presentations, such as technical research presentations, or board meeting presentations.

Most computer printers have the ability to print on transparency film. However, once a stack of transparency sheets is printed out, the sheets tend to stick to one another due to surface electrostatic build-up. As a result, when a speaker is giving a presentation, it is difficult to grasp individual sheets and place them on the projector.

Another problem is that when all the printed transparencies are placed in a stack, it is difficult to read the contents of a particular sheet of transparency film. When a stack of transparencies has been printed with the desired information, a user will often wish to examine each transparency for accuracy and visual design layout. Such an examination is facilitated if opaque sheets of paper are interleaved between the printed transparency sheets.

Moreover, a person making a presentation will often prefer to assess the contents of the next transparency that he is about to place on the overhead projector. Being able to spend a few seconds reading the printed information on the transparency allows the person making the presentation to gather his thoughts on what he is about to say. In past approaches, however, the content appears visually jumbled because the sheets are transparent. Opaque sheets may be inserted between the transparencies manually, but the task of separating and interleaving the printed transparencies with opaque sheets is both tedious and time-consuming.

To overcome the foregoing problems, one solution is to design and manufacture a specialized computer printer for transparencies. However, such a solution is expensive and not very versatile.

Based on the foregoing, there is a need for a computer output device that can automatically interleave pages from a first source tray between pages of a document that the device is outputting using a second source tray.

In particular, there is a need for a low-cost method or mechanism that can automatically print or otherwise output printed transparencies separated by appropriate separation sheets.

SUMMARY OF THE INVENTION

The foregoing needs and objects, and other needs and objects that will become apparent from the following disclosure, are fulfilled by the present invention, which comprises, in one aspect, a method for printing an electronic document with automatically interleaved separation sheets. In one embodiment, this aspect may be used for controlling a computer output device to automatically interleave pages from a first source tray between pages of a document that the device is outputting using a second source tray, for example, using transparency film and opaque separation sheets.

One feature of this aspect is to convert an existing computer software printer driver such that it includes a transparency printing option, with a sub-option for interleaving separation sheets between the printed transparencies. According to another feature, the method further involves generating a new computer printer description file, based on the original printer description file of the existing printer.

In another feature, the printer driver is reinstalled using the newly generated printer description file. Reinstalling the computer printer driver may involve running the executable printer driver installer file and designating the newly generated computer printer description file as the input file when an installer prompts for such a file.

According to still another feature, the new printer driver automatically alters a graphical user interface of an operating system with which the printer driver is used, thereby providing new printing features, including the option of selecting a particular source tray for the transparency film as well as a source tray for the separation sheets.

According to another feature, the invention provides a method for generating a new computer printer description file, comprising the steps of identifying and describing all available source trays for separation sheets in the output device; redefining a print command to print a transparency from a user designated transparency source tray, immediately followed by inserting a separation sheet from a user designated source tray for separation sheets; and generating a time stamp.

In other aspects, the invention encompasses a computer apparatus, a computer-readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram illustrating an overview of one embodiment of the invention;

DETAILED DESCRIPTION OF THE PREFERRED EMBODIMENT

A method and apparatus for printing an electronic document with automatically interleaved separation sheets. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OVERVIEW

Electronic documents are printed with automatically interleaved separation sheets. In one embodiment, a conventional computer printer, having at least two (2) paper input trays or source trays, may be controlled to print one or more transparencies, automatically separated by or interleaved with blank opaque pages.

Figure 5:
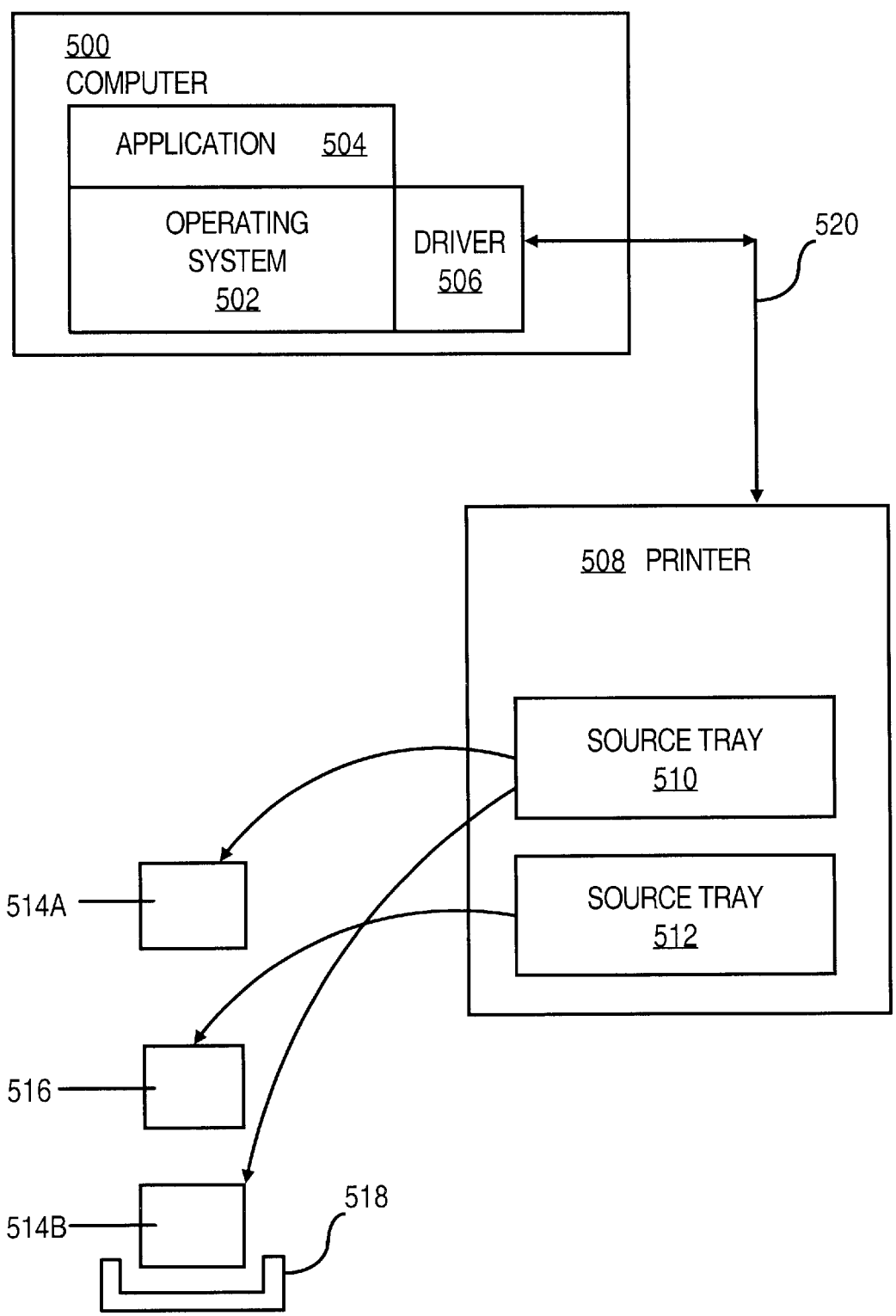
FIG. 5 is a block diagram of a computer system context to which the invention may be applied.

FIG. 5 illustrates one context in which an embodiment may be used. Computer 500 is coupled by a data connection 520 to a printer 508. The term "computer" with reference to computer 500 is used in a broad sense to refer to any device that is capable of generating output to an output device. For example, computer 500 may be a mainframe computer, workstation, personal computer, or other device with a processing unit. Similarly, the term "printer" with reference to printer 508 is used in a broad sense to refer to any output device. Printer 508 may be a laser printer, impact printer, image printer, or other output device.

Connection 520 may be any data connection between computer 500 and printer 508. For example, connection 520 can be a cable coupled from computer 500 to printer 508, or a wireless data transmission channel. Alternatively, connection 520 is a local area network, internetwork, or Internet connection.

Computer 500 executes under control of an operating system 502, such as UNIX, Mac OS, or Windows®. An application program 504 runs under control of the operating system 502. Application program 504 may be, for example, a word processor that generates electronic documents for printing on printer 508. Other examples of application programs 504 include spreadsheet programs, graphics programs, financial applications, etc.

Driver 506 controls communications of operating system 502 to printer 508. Generally, computer programs called "device drivers" or "drivers" control computer devices such as output devices, disk drives or input devices. Other computer programs that use or communicate with a computer device use its device driver as an intermediary to translate the communication into a language that the device can understand. This facilitates device independence. For example, when application 504 is a word processor, the word processor cannot directly instruct printer 508 how to generate a particular page. Instead, the word processor instructs the operating system to send page output to the printer 508. Operating system 502 forwards the page output to driver 506. The driver 506 converts the page output into a format that can drive the printer 508.

Drivers normally generate output in a printer-specific manner. For example, an output device such as a computer printer can only understand instructions written in a specialized language such as a page description language ("PDL"). The term PDL refers to a class of source languages that are used for describing the layout and content of a printed page, and to control computer printers. There are several PDLs, such as PostScript and Hewlett-Packard's Printer Control Language ("PCL").

Printer 508 has first and second source trays 510, 512. Each source tray 510, 512 is a storage receptacle, bin or tray that holds source material on which an image can be printed or that can be used as an interleaved sheet. For example, a printer may have first and second paper trays. Two trays 510, 512 are shown in FIG. 5 as an example, but printer 508 may have more than two trays. An example of a printer with multiple trays is the Ricoh® laser printer model Aficio MP01.

Printer 508 also has at least one output tray 518 for receiving printed sheets.

FIG. 1A illustrates an overview of one embodiment of a method of printing electronic documents with automatic interleaving. An initial step involves generating a new computer printer description file 522A, as shown by block 100. The new printer description file 522A, and an existing computer printer driver 506, are used in later steps to generate a new printer driver 506A that implements automatic interleaving.

In one embodiment, a printer driver, such as driver 506, is used in connection with printer 508 that has first and second source trays 510, 512. The first source tray 510 and the second source tray 512 each contain source pages. A multi-page document, which has two (2) pages in this example, is printed on pages 514A, 514B obtained from the first source tray 510, and a blank page 516 obtained from the second source tray 512 are automatically interleaved between successively printed pages 514A, 514B. The printer driver is modified to provide an option for the computer printer to automatically output separation pages that are interleaved between the pages of an output document. Printing is originated from application program 504 running on computer 500 that is coupled, directly or indirectly, to the printer 508.

According to one feature of the embodiment, the existing computer printer driver 506 is manipulated by generating a new computer printer description file 522A to be used as an input file when installing the driver 506. The generation of a new computer printer description file 522A is described in greater detail below. A computer printer description file controls the use of special features in a particular computer printer and may be written in a PDL.

The new computer printer description file 522A may contain, among other things, information on pagination, definition of the print command, and the availability and description of source trays in the computer printer. The print command or pagination definition may provide for automatic interleaving, between printed sheets of transparency film, of a separation page obtained from a user-selected source tray. For example, in one embodiment, a PostScript pagination definition for a driver 506 for a printer 508 with first and second source trays 510, 512 is modified to provide for the automatic interleaving of blank opaque separation sheets from a source tray different from that of the transparency film.

In addition, the new computer printer description file 522A may define a graphical user interface that gives the user the option to select transparency printing as a computer printer feature, as well as the ability to select a source tray for the separation sheets.

Referring to FIG. 1A, when the new computer printer description file 522A is generated, a new computer printer driver 506A can be installed in a computer system that operates with the printer, as shown by block 130. For example, driver 506 is installed in computer 500, which is coupled to printer 508. The installation procedure requires printer description file 522A as input.

Once the installation is complete, the new computer printer driver 506A is ready for use. From then on, a document can be printed using automatic interleaving of separation sheets, as shown by block 160. For example, application 504 may print a document on transparency film obtained from source tray 510, interleaved with opaque sheets obtained from tray 512. Using the new transparency printing option is described in greater detail below.

GENERATING A NEW DRIVER

The new computer printer driver 506A is derived from an existing computer printer driver 506. Computer 500 may have access to a number of computer printers on a network to which the computer is connected by connection 520. Thus, the first step in generating new computer printer driver 506A is to select a printer and its associated printer description file, using facilities provided by the operating system 502. As an example, a PostScript printer and its PostScript printer description file can be selected via a file selection dialog provided by the Windows® operating system.

In one aspect of the invention, a new computer printer description file 522A is automatically generated by a printer description file generation tool that uses an existing computer printer description file 522 as input. The existing computer printer description file 522 is parsed to gather information on the various features of the selected computer printer. Based on the information gathered, the new computer description file 522A is created.

Figure 1B:
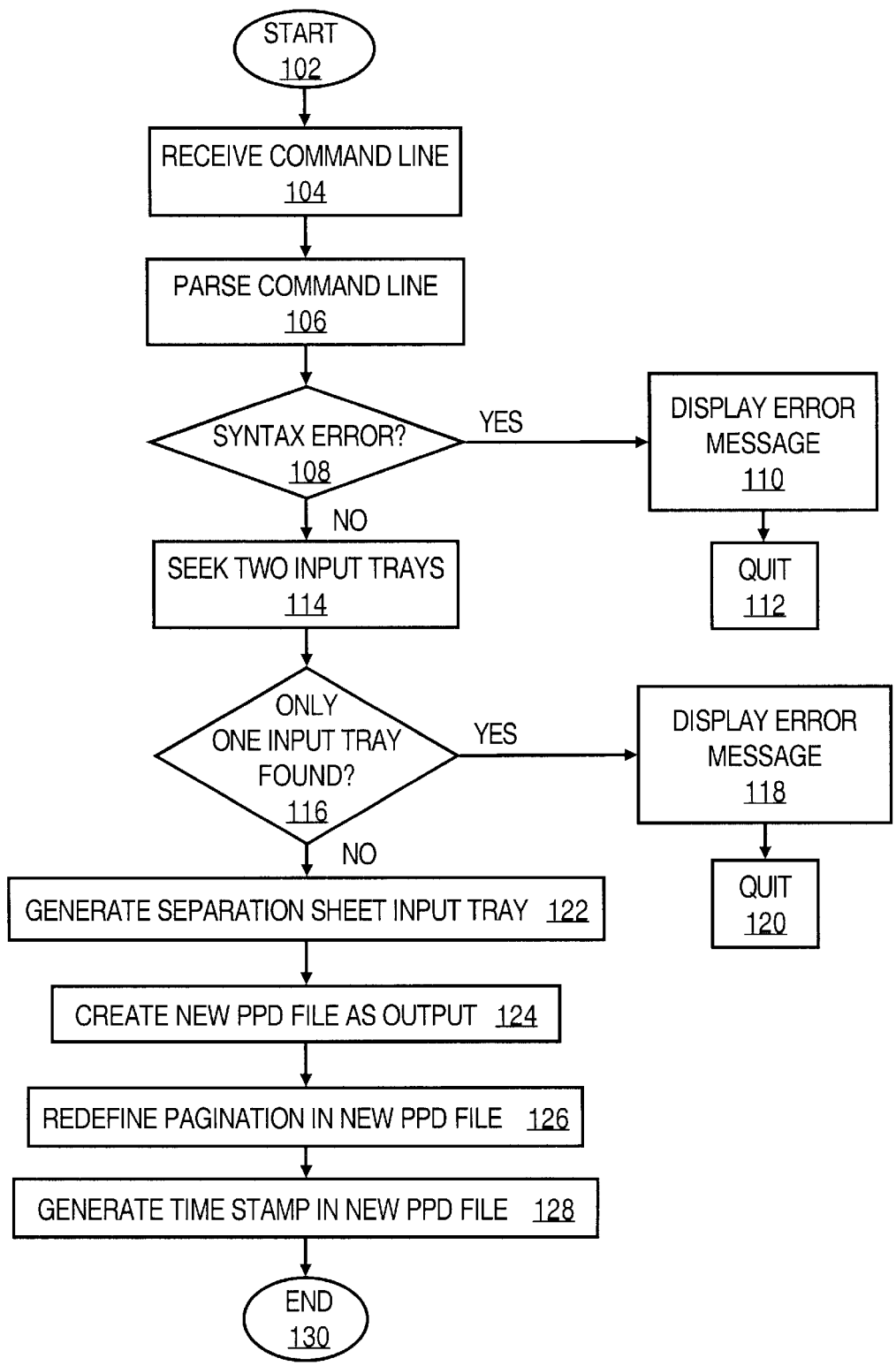
FIG. 1B is a flow chart illustrating one embodiment of steps of generating a new driver.

FIG. 1B is a flow chart illustrating steps of one embodiment of a method of generating a new printer description file 522A, which in turn is used in generating the new computer printer driver 506A. At block 104, a command line is received by the process. For example, an executable version of a printer description file generation tool is run by computer 500 using the command language of operating system 502 and specifying an input and output file. The input file is existing printer description file 522 and the output file is new printer description file 522A. An example of a command line is "RUN TMPPDGEN RI01S100.PPD RITRANSP.PPD", where TMPPDGEN is the executable version of the printer description file generation tool, RI01S100.PPD is the input file and RITRANSP.PPD is the output file.

At block 106, the command line is parsed. Control passes to block 108, in which the process tests whether the command line contains a syntax error in the form of the command line. The computer can understand a command line only if the command line contains certain words and punctuation in a form that the computer expects. If it is determined that there is a syntax error, control passes to block 110, in which an error message is displayed. In the preferred embodiment, the following error message is displayed:

Syntax: TPPDGEN.EXE<OEM PPD file(input) ><Transparency Printer PPD file(output)>[R|D]

EXAMPLES

| TPPDGEN.exe | RIMP01S100 | RITRANSP |
|---|---|---|
| tppdgen | aplwbgrl | aptransp |
| tppdgen | DEFPRTR2 | DEsample |

The process may then terminate at block 112, because no progress can be made until the syntax error is corrected. Alternatively, the process may provide the user with an opportunity to correct the error online.

If no syntax error is found, then at block 114, information on the source input trays in the computer printer is gathered from the existing printer description file. In particular, the process scans the existing printer description file in an attempt to locate a description of two or more source trays or input trays that can be used for separation sheets. Preferably, the process seeks descriptions labeled InputSlot and referring to a manual feeder. In block 116, the process tests whether the printer has only one source input tray. If it is determined that the computer printer has only one source input tray, then control passes to block 118, in which an error message is displayed, because at least two source input trays must be available in the computer printer to accomplish automatically interleaved printing. The error message informs the user that the existing computer printer is unable to accommodate a transparency feature, because there is no source tray one type of sheets. Control then passes to block 120, at which the process terminates. The user may address this error situation, for example, by selecting a different printer, having two or more source input trays.

At block 122, a definition of a separation sheet input tray is created based on the existing printer description file. In one embodiment, a description in the existing printer description file is modified. Definitions of the available source input trays in the computer printer may be redefined to allow for outputting separation pages when a user selects one of the source input trays as a source for separation pages. The modification may also include changing the value of a keyword, such as

*PCFileName:<Transparency Printer PPD File(output)>

At block 124, a new printer description file is created as the output file. The output file name that was specified in the command line is used in creating the new file. At block 126, the pagination definition in the existing computer printer description file is modified to output blank separation pages when a user selects the transparency printing option. Block 126 may involve, for example, generating a customized keyword XY transparency that redefines the PostScript LH keyword to print a transparency page and then append a blank separation sheet that is input from the tray or source identified in the prior steps. The re-defined LH definition for each of the separation sheet input tray may be as follows:

```
/LH    {
           showpage
           gsave
           <<separation sheet input tray description>>
           copypage
           grestore
       } def
```

At block 128, in one embodiment, a time stamp is generated to indicate when the new printer description file was created and that the purpose of the new printer description file is to generate a new computer printer driver capable of accommodating a transparency printing option. The steps of block 128 facilitate version control, and are optional.

An example of a modified, new printer description file is provided in the Appendix of this disclosure.

INSTALLING THE DRIVER

Figure 1C:
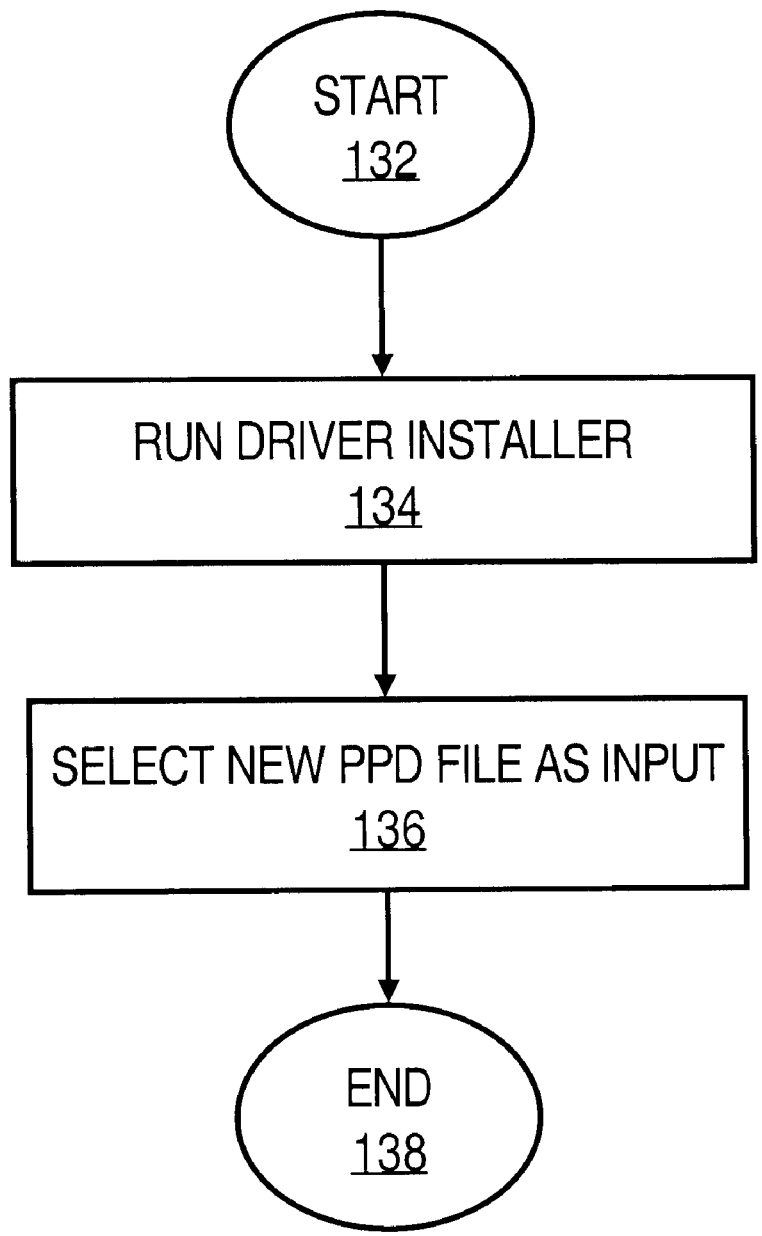
FIG. 1C is a flow chart illustrating one embodiment of steps of a new driver.

Once the new printer description file 522A has been generated, a new printer driver 506A may be generated and installed. FIG. 1C is a flow chart illustrating one embodiment of a process for installing a new printer driver that provides automatic interleaving of separation sheets.

At block 134, the process runs a driver installer. For example, a printer driver installer, such as a PostScript driver installer, is executed on computer 500 by typing an install command line using operating system 502. For example, the driver installer may be named "SETUP.EXE", and the command RUN SETUP.EXE will start the installation procedure under control of the DOS or Windows® operating systems. Use of a discrete driver installer program is not required. What is important is that the process initiates a mechanism for installing a driver.

Figure 3A:
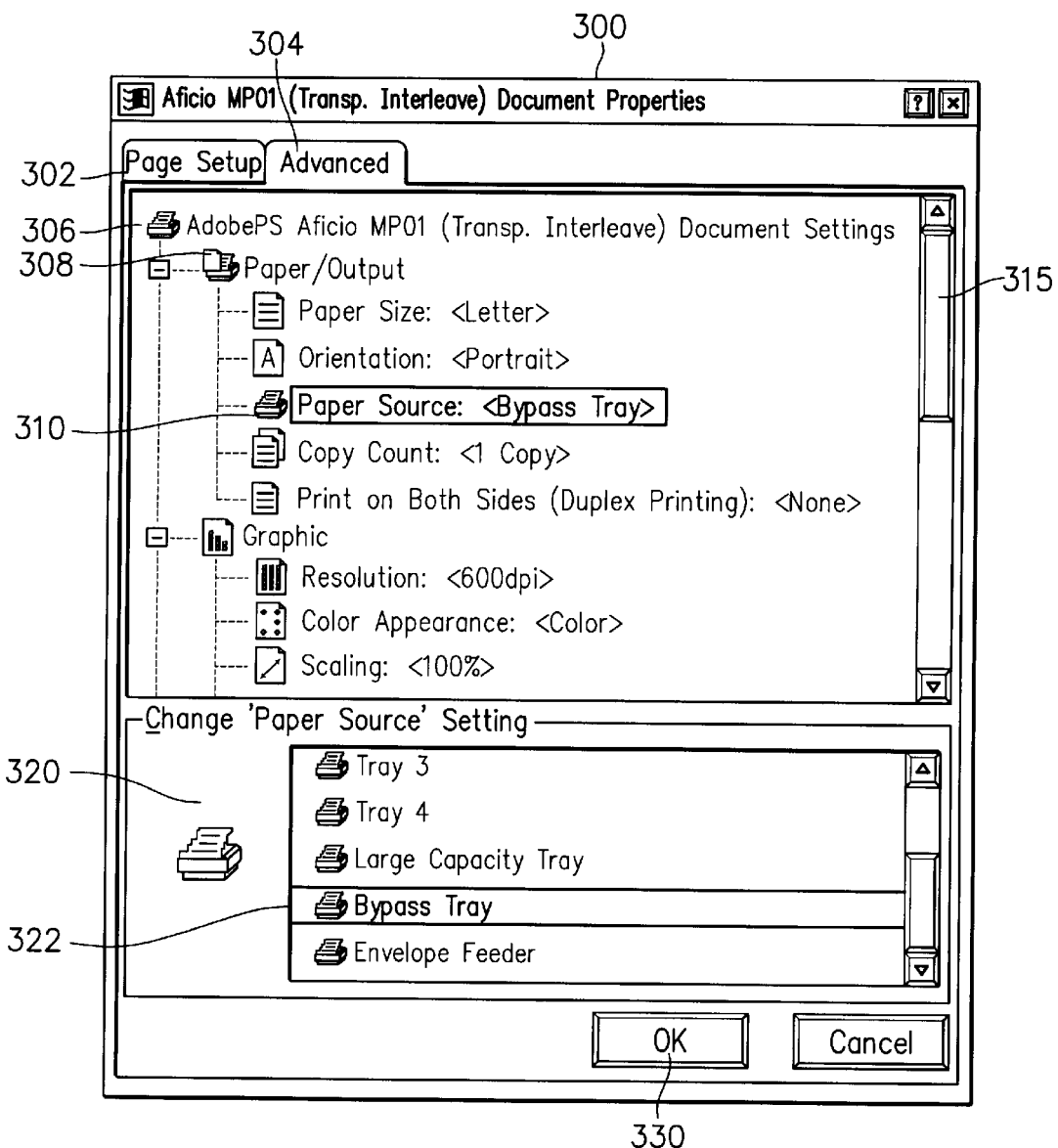
FIG. 3A illustrates an exemplary graphical user interface of a computer printer driver offering options relating to the transparency document properties.
Figure 3B:
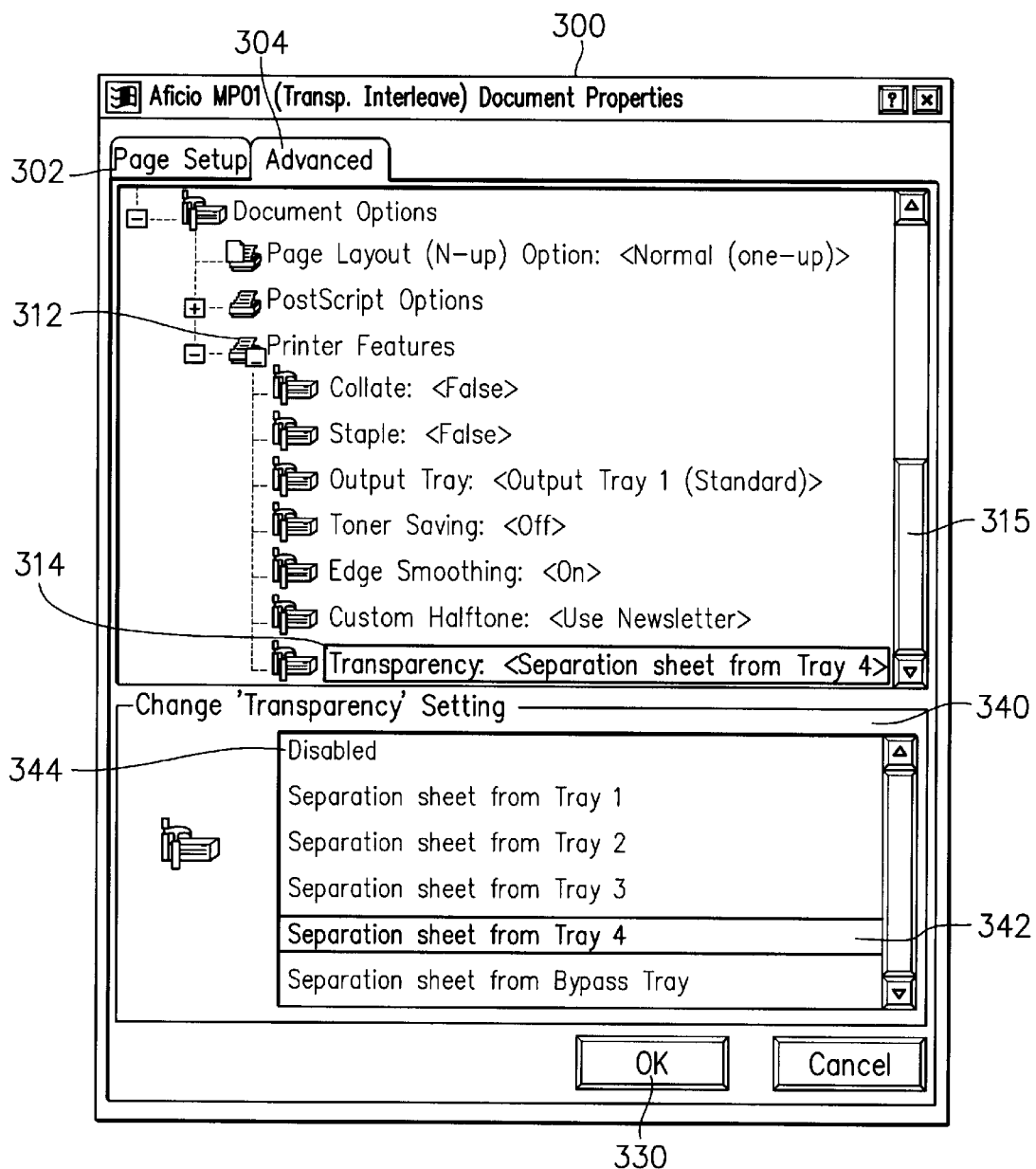
FIG. 3B illustrates an exemplary graphical user interface of a computer printer driver offering a transparency printing feature and choice of separation sheet source trays.

At block 136, the new printer description file 522A is selected as input to the installer. For example, the driver installer may prompt the user to enter the name of an input file, using a dialog box generated under control of the operating system 502. For example, RITRANPS.PPD is selected as an input file. The driver installer executes in conventional manner. In the course of executing, the driver installer integrates the new printer description file 522A into the new printer driver 506A. The integration procedure involves creating a new printer "Document Properties" graphical user interface dialog panel as shown in FIG. 3B. This is done by adding the Original Equipment Manufacturer's ("OEM") customized keyword and related option statements such as:

RI Transparency
RI transparency 1/Disabled:"
RI transparency 2/Separation sheet from Tray 1:"
RI transparency 3/Separation sheet from Tray 2:"
RI transparency 4/Separation sheet form Tray 3:"
RI transparency 5/Separation sheet from Tray 4:"
RI transparency 6/Separation sheet from Bypass Tray:"

When the installation is complete, the new printer driver 506A accommodates an automatic interleaved printing option. The new printer driver, with the output interleaving feature, has an icon in the system printer folder, and the new printer driver is then ready to be used by any application.

Further, the conversion process causes the new printer driver 506A to include instructions or commands that generate a graphical user interface in cooperation with operating system 502. A windowed operating system 502 may provide, conventionally, a Print function that is callable or accessible by any application program running under control of the operating system. When the application program needs to offer a Print function to the end user, the application program calls one or more functions of an application programming interface (API) of the operating system. The operating system generates one or more panels with fields, buttons, and other elements. The specific fields, buttons, options, sub-panels, and other elements that are displayed are created by the operating system based on the values of parameters in a driver that is associated with the currently selected printer. The user selects appropriate print parameters and commands the system to print. The functions of the operating system interact with the application program to move data to the printer.

Of course, the appearance of the computer printer driver's graphical user interface varies according to the operating system. For example, the graphical user interface in a Windows® operating system will appear different from that of a Macintosh® operating system.

When the new computer printer driver 506A is installed, the installation process involves modifying parameters of the driver that are used by the operating system 502 to generate the panels and other graphical user interface elements. The modified parameters cause the Print command to reflect an interleaved printing option, when an application program invokes the Print command for a printer that is associated with the new computer printer driver 506A. Accordingly, when an application program invokes the Print command, and the user selects a printer that is associated with the new printer driver 506A, the graphical user interface generated by operating system 502 will include the option of printing transparencies, enable the user to select a particular source tray for transparencies, and enable the user to select a second source tray from which the printer will obtain separation pages.

Figure 2:
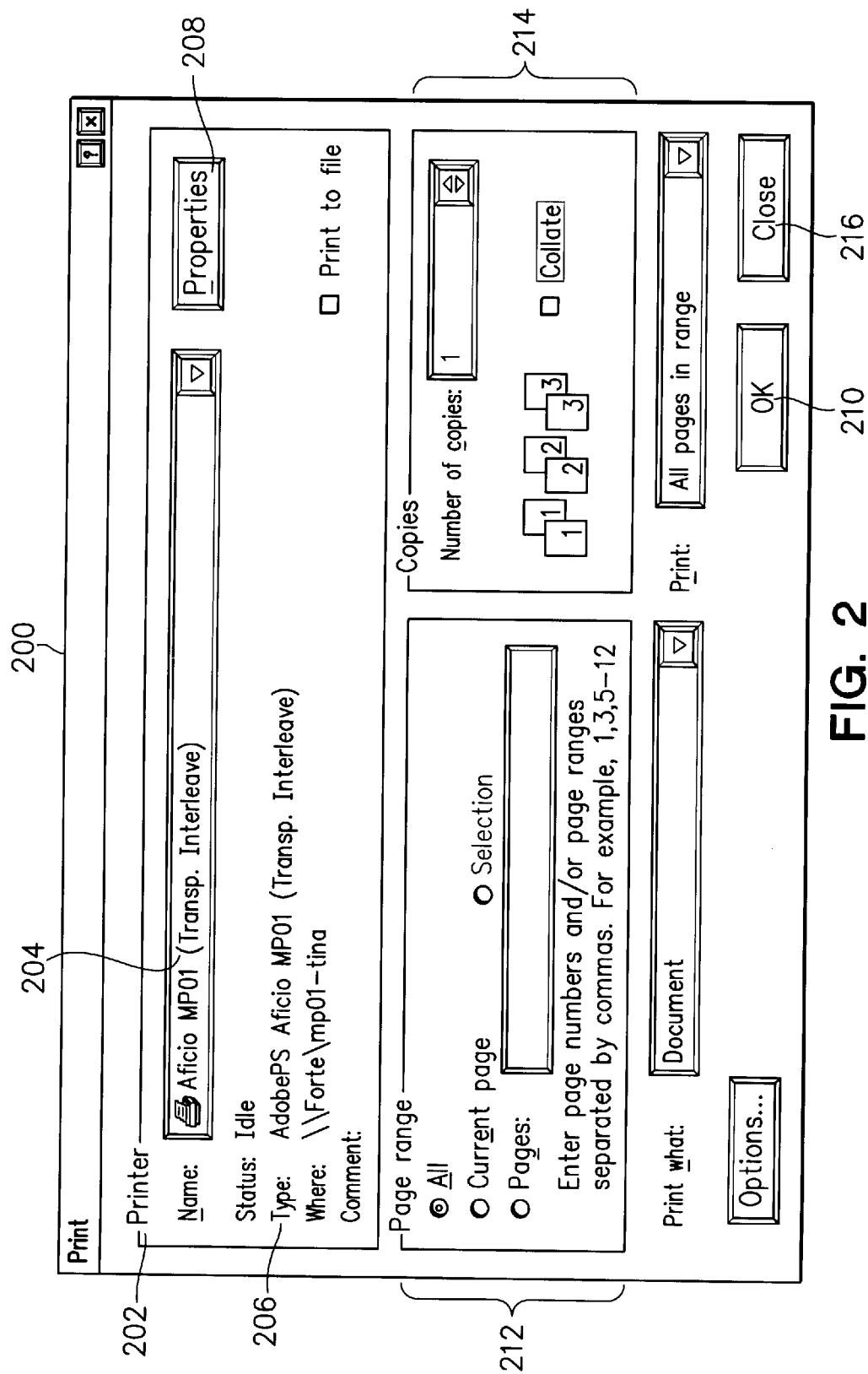
FIG. 2 illustrates an exemplary graphical user interface of a computer printer driver offering a choice of source trays for the transparency film.

FIG. 2 is a diagram of a Print dialog box 200 that is generated by the Windows® operating system under control of a new printer driver 506A, according to one embodiment. Print dialog box 200 includes a Printer identification pane 202, which has a Printer Name field 204, Printer Type field 206, and a Properties button 208. Each element of Print dialog box 200 is derived by the operating system 502 from values that are stored in the printer driver 506A. For example, the Printer Name field 204 displays the name of the currently selected printer. The name value is obtained from the printer driver 506A. The Printer Type field 506 indicates the type of printer that is in use. In the example of FIG. 2, the term "Transp.Interleave" indicates that the currently selected printer is capable of printing transparencies interleaved with opaque sheets.

As is conventional for Print panels that are generated for use with Windows® programs, Print dialog box 200 also includes a Page Range pane 212 in which the user may specify values identifying the particular pages to be printed. The user may specify values indicating the number of copies to be printed using a Copies pane 214. Printing may be canceled by selecting a Cancel button 216. Printing may be initiated by selecting an OK button 210.

The Properties button 508 may be selected by a user in order to view or enter further parameter values relating to the currently selected printer. In one embodiment, selecting the Properties button 508 causes the driver 506A and operating system 502 to display a Properties dialog box 300 as shown in FIG. 3A and FIG. 3B. The structure and function of the Properties dialog box 300 are now described in conjunction with FIG. 1D.

PRINTING USING THE NEW DRIVER

Figure 1D:
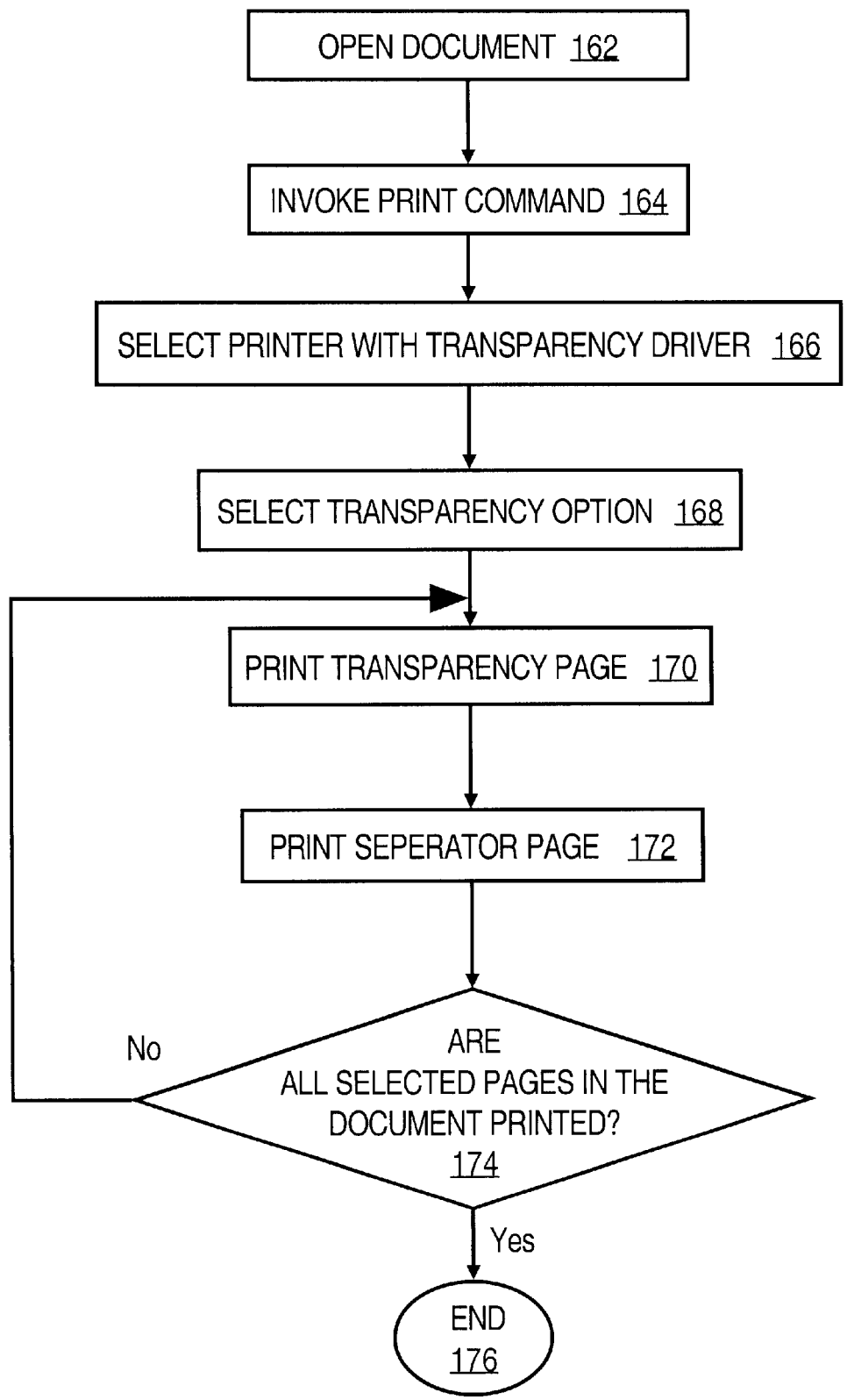
FIG. 1D is a flow chart illustrating one embodiment of steps of printing with a new driver.

FIG. 1D illustrates an example print operation using the newly created interleaved printing option of printer driver 506A in conjunction with computer 500 and printer 508. This example assumes that the user is printing more than one transparency, with which opaque sheets are interleaved.

At block 162, the document to be printed is opened. For example, an electronic document may be opened, by launching an application program 504, such as a word processing application, using the operating system 502.

At block 164, a Print command is invoked. For example, a user commands application program 504 to print the open document. When the Print command is invoked, operating system 502 displays a dialog box that requests the user to input parameter values that determine how the printing will be carried out. FIG. 2 is an illustration of a Print dialog box 200.

Referring to FIG. 1D again, after the Print command is invoked, control passes to block 166 in which a printer with the new driver 506A is selected. The top portion of the dialog box 200 is a Printer identification pane 202. The user selects the newly installed printer in the Name field 204. In the illustration, the Name of the printer is "Aficio MP01 (Transp. Interleave)". In the Printer identification pane 202, Type field 206 identifies the type of printer selected. In the illustration, Type field 206 indicates that the printer is an Adobe PostScript printer with an added transparency printing option.

The user may select Properties button 208 in the Printer identification pane 202 in order to set or view other properties of the printer. For example, at block 166 the user may select a particular source tray of the printer as the source of transparency sheets. The user may also select another particular source tray as the source of opaque sheets. The selection process may be carried out by selecting the Properties button 208, and by using the steps that are now described.

FIG. 3A is an illustration of a Properties dialog box 300 showing values of properties of the selected printer, namely Aficio MP01 (Transp. Interleave). Properties dialog box 300 has a Page Setup tab 302, and Advanced tab 304. FIG. 3A and FIG. 3B show information displayed in dialog box 300 when Advanced tab 304 is selected. The Advanced tab 304 shows some values of properties of the printer, in the form of a tree 306.

A Paper/Output branch 308 of tree 306 shows properties related to output. Within the Paper/Output branch 308 are several nodes. In order to print the document using the transparency feature, a source tray to contain the transparency film is selected. The Paper Source node 310 is selected. Then a tray is designated as the Paper Source. In the illustration, a Bypass Tray value 322 is selected from a Change Paper Source Setting pane 320. This selection indicates that the Bypass Tray of the Aficio MP01 printer should be used as a source of transparencies.

Referring again to FIG. 1D, at block 168 a transparency option is selected. Selection of a transparency option instructs the printer driver 506A that the user will be printing transparencies, and that separation sheets should be obtained from a particular source tray. The user may use the scroll bar 315 of FIG. 3A to scroll down the tree 306 so that a Printer Features branch 312 is visible. Alternatively, dialog box 300 may be displayed in a size sufficient to show all branches of tree 306.

FIG. 3B illustrates the Advanced tab 304 of dialog box 300, showing the Printer Features branch 312. Printer Features branch 312 has a Transparency feature node 314. When the user selects Transparency feature node 314, in response, the process displays a Change Transparency Setting pane 340 in dialog box 300. The user may then select a source tray for the separation sheets, from among available trays that are defined for the current printer. Selecting a separation sheet source tray is accomplished by selecting a value from the Change Transparency Setting window 340, such as the "Separation sheet from tray 4" value 342. Selecting value 342 instructs the printer driver 506A that opaque separation sheets should be taken from "tray 4" of the current printer.

The user may also select a "Disabled" value 344 to indicate that separation sheets will not be used.

Once a tray for separation sheets has been selected, the user may click on the "OK" button 330 to commence printing. Thus, block 168 of FIG. 1D may include the step of instructing the computer 500 to initiate printing, for example, by instructing application program 502 to print an electronic document.

Referring again to FIG. 1D, block 170, block 172, and block 174 illustrate steps involved in printing an electronic document, with interleaved separator pages.

In block 170, a transparency page is printed. For example, the electronic document that was opened in block 162 is sent from application 504, using operating system 502, to new printer driver 506A. In response, new printer driver 506A converts the information received from application 504 into a form that is understandable by printer 508. This may involve converting the received information into a PCL, parsing commands embedded in the received information, or other formatting and conversion steps. The particular steps are not critical; what is important is that new printer driver 506A receives information to be printed, and generates an output page that is printable by printer 508.

Printer driver 506A then sends the formatted page to printer 508, along with instructions that tell printer 508 to obtain a blank transparency from the transparency source tray that was selected in block 166 or block 168. Printer 508 obtains a blank transparency from that tray and feeds it into the printer. Driver 506A instructs the printer to print on the transparency and deliver the printed transparency to output tray 518.

A separator sheet is automatically output, as shown by block 172. For example, Driver 506A further instructs the printer 508 to obtain a blank separator sheet from the separator source tray that was selected in block 166 or block 168, and to pass the blank separator sheet through the printer to output tray 518 without printing information on it.

In block 174, driver 506A determines whether all the selected pages in the electronic document have been printed. In this context, for example, "selected pages" refers to the pages that are identified in Page Range pane 212 of FIG. 2. If all the selected pages in the electronic document are printed, control passes to block 176 at which the process is complete. Control may be then returned to the application program 502 or to another program or process. Otherwise, control passes back to block 170. The loop of block 170, block 172, and block 174 continues until all the selected pages in the electronic document are printed.

As a result, an electronic document is printed with automatically interleaved separator sheets.

HARDWARE OVERVIEW

Figure 4:
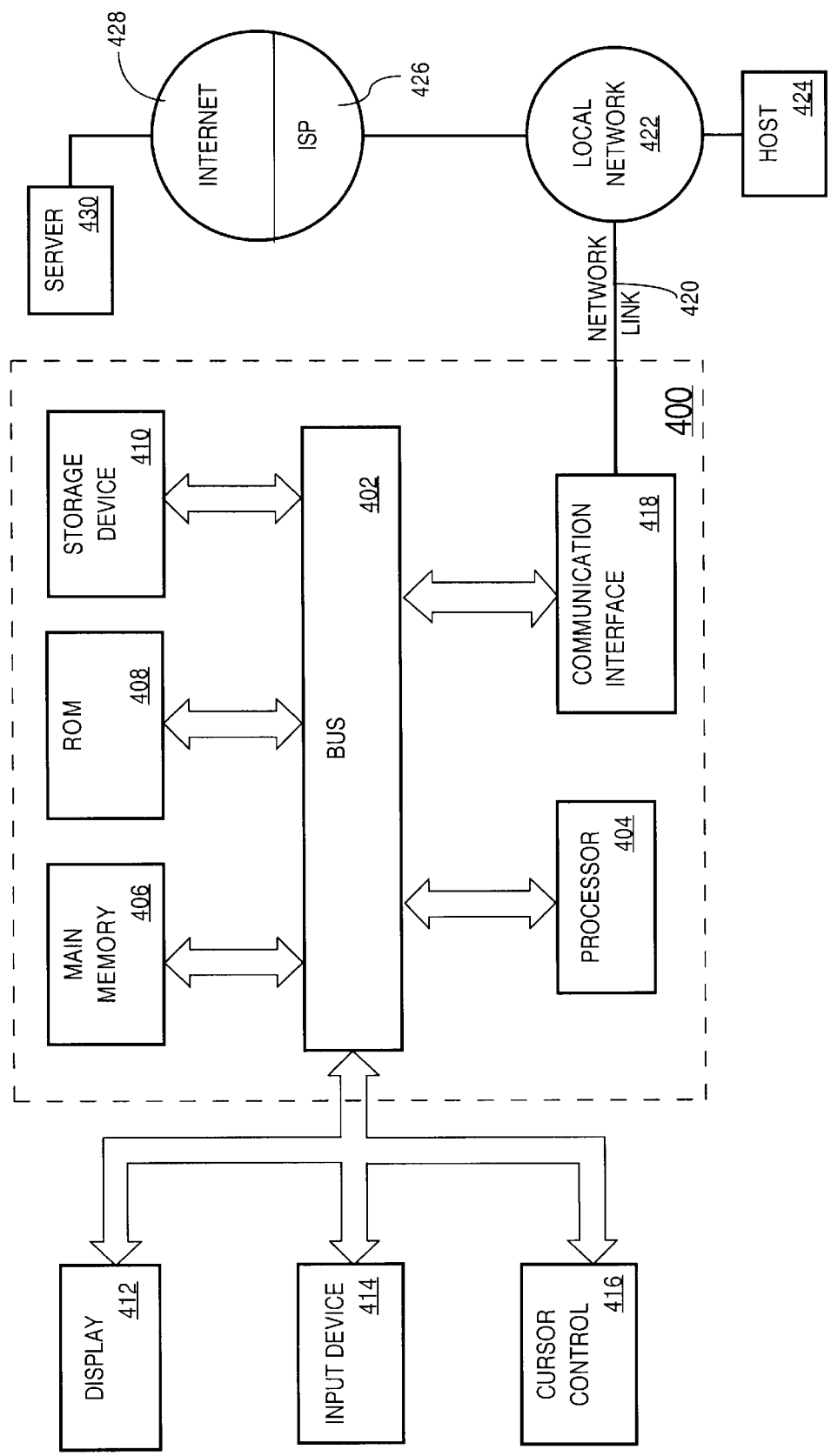
FIG. 4 is a block diagram of a computer system hardware arrangement that can be used to implement the invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for processing the pages of a document. According to one embodiment of the invention, the processing of pages of a document is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for processing pages of a document as described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of printing an electronic document on a printing device, the method comprising the steps of:
   a computer automatically generating, based on an existing description of attributes of the printing device, a new description of the attributes of the printing device, wherein the new description includes information that describes an automatic interleaving option;
   the computer automatically generating a new driver program based on the new description;
   the printing device obtaining, in response to signals from the new driver program, first page material from a first page source of the printing device;
   the printing device obtaining, in response to the signals, second page material from a second page source of the printing device;
   the printing device printing, in response to the signals, one or more pages of the electronic document on the first page material; and
   the printing device automatically interleaving, in response to the signals, the second page material with the pages as the pages are printed.

2. The method as recited in claim 1, wherein the existing description lacks the information that describes the automatic interleaving option.

3. The method as recited in claim 1, further comprising:
   the computer identifying, in the existing description, data describing one or more available paper source trays of the printing device; and
   the computer generating, in the new description, data that describes the available paper source trays.

4. The method as recited in claim 1, further comprising:
   the computer automatically generating, in the new description, instructions that cause a graphical user interface to display a transparency printing feature.

5. The method as recited in claim 1, further comprising:
   the computer automatically redefining a pagination attribute in the new description.

6. A computer-readable medium carrying one or more sequences of instructions for printing an electronic document, wherein execution of the one or more sequences of instructions by one or more processors causes the one or more processors to perform:
   generating, based on an existing description of attributes of a printing device, a new description of the attributes of the printing device, wherein the new description includes information that describes an automatic interleaving option;
   generating a new driver program based on the new description;
   wherein the new driver program causes the printing device to obtain first page material from a first page source of the printing device;
   wherein the new driver program causes the printing device to obtain second page material from a second page source of the printing device;
   wherein the new driver program causes the printing device to print one or more pages of the electronic document on the first page material; and
   wherein the new driver program causes the printing device to automatically interleave the second page material with the pages as the pages are printed.

7. The computer-readable medium recited in claim 6, wherein the existing description lacks the information that describes the automatic interleaving option.

8. The computer-readable medium recited in claim 6, wherein execution of the one or more sequences of instructions by the one or more processors further causes the one or more processors to perform:
   identifying, in the existing description, data describing one or more available paper source trays of the printing device; and
   generating, in the new description, data that describes the available paper source trays.

9. The computer-readable medium recited in claim 6, wherein execution of the one or more sequences of instructions by the one or more processors further causes the one or more processors to perform:
   generating, in the new description, instructions that cause a graphical user interface to display a transparency printing feature.

10. The computer-readable medium recited in claim 6, wherein execution of the one or more sequences of instructions by the one or more processors further causes the one or more processors to perform:
    redefining a pagination attribute in the new description.

11. A system comprising:
    a computer configured to:
       automatically generate, based on an based on an existing description of attributes of a printer, a new description of the attributes of the printer, wherein the new description includes information that describes an automatic interleaving option; and
       automatically generate a new driver program based on the new description; and
    the printer, wherein the printer is configured to:
       obtain, in response to signals from the new driver program, first page material from a fist page source of the printer;
       obtain, in response to the signals, second page material from a second page source of the printer;
       print, in response to the signals, one or more pages of an electronic document on the first page material; and
       automatically interleave, in response to the signals, the second page material with the pages as the pages are printed.

12. The system recited in claim 11, wherein the existing description lacks the information that describes the automatic interleaving option.

13. The system recited in claim 11, wherein the computer is further configured to:
    identify, in the existing description, data describing one or more available paper source trays of the printer; and
    generate, in the new description, data that describes the available paper source trays.

14. The system recited in claim 11, wherein the computer is further configured to:
    automatically generate, in the new description, instructions that cause a graphical user interface to display a transparency printing feature.

15. The system recited in claim 11, wherein the computer is further configured to:
    redefine a pagination attribute in the new description.

* * * * *